US011535139B2

(12) United States Patent
Ogiso et al.

(10) Patent No.: US 11,535,139 B2
(45) Date of Patent: Dec. 27, 2022

(54) SEAT DEVICE

(71) Applicant: AISIN CORPORATION, Aichi (JP)

(72) Inventors: Takashi Ogiso, Tajimi (JP); Kazuo Noso, Toyoake (JP)

(73) Assignee: AISIN CORPORATION, Kariya (JP)

( * ) Notice: Subject to any disclaimer, the term of this patent is extended or adjusted under 35 U.S.C. 154(b) by 1356 days.

(21) Appl. No.: 15/567,300

(22) PCT Filed: Mar. 29, 2016

(86) PCT No.: PCT/JP2016/060212
§ 371 (c)(1),
(2) Date: Oct. 17, 2017

(87) PCT Pub. No.: WO2016/170936
PCT Pub. Date: Oct. 27, 2016

(65) Prior Publication Data
US 2018/0147964 A1 May 31, 2018

(30) Foreign Application Priority Data

Apr. 23, 2015 (JP) .............................. JP2015-088413

(51) Int. Cl.
*A61H 9/00* (2006.01)
*B60N 2/90* (2018.01)
*A61H 99/00* (2006.01)

(52) U.S. Cl.
CPC ............ *B60N 2/976* (2018.02); *A61H 9/0078* (2013.01); *A61H 99/00* (2013.01); *B60N 2/90* (2018.02);
(Continued)

(58) Field of Classification Search
CPC . B60N 2/00; B60N 2/90; B60N 2/914; B60N 2/976; B60N 2/66; B60N 2/665;
(Continued)

(56) References Cited

U.S. PATENT DOCUMENTS

| 6,312,400 B1 * | 11/2001 | Itikawa | ................... | A61H 7/004 |
| | | | | 601/100 |
| 2005/0020946 A1 * | 1/2005 | Kim | ........................ | A61H 7/004 |
| | | | | 601/15 |

(Continued)

FOREIGN PATENT DOCUMENTS

| JP | S59-172426 | * 11/1984 | ............. A61H 15/00 |
| JP | S59-172426 U | 11/1984 | |

(Continued)

OTHER PUBLICATIONS

International Preliminary Report on Patentability and Written Opinion dated Oct. 24, 2017 in PCT/JP2016/060212 (submitting English translation only).

(Continued)

*Primary Examiner* — LaToya M Louis
(74) *Attorney, Agent, or Firm* — Oblon, McClelland, Maier & Neustadt, L.L.P.

(57) ABSTRACT

A seat device is provided with: a first air bag expanding and contracting inside a seat surface skin; a holding member for holding the first air bag and movable along the inner surface of the seat surface skin; a drive device for moving the holding member so as to change the arrangement of the first airbag; and a second air bag independent of the first air bag, the second air bag expanding inside the seat surface skin so as to press the seat surface skin to separate the seat surface skin from the first air bag.

10 Claims, 8 Drawing Sheets

(52) U.S. Cl.
CPC ...... *B60N 2/914* (2018.02); *A61H 2201/0103* (2013.01); *A61H 2201/0149* (2013.01); *A61H 2201/0192* (2013.01); *A61H 2201/1623* (2013.01); *A61H 2201/5002* (2013.01); *A61H 2205/081* (2013.01)

(58) Field of Classification Search
CPC ........ B60N 2/666; B60N 23/047; A61H 9/00; A61H 9/005; A61H 9/0078; A61H 37/00; A61H 39/00; A61H 2201/0119; A61H 2201/0134; A61H 2201/0138; A61H 2201/0142; A61H 2201/0146; A61H 2201/0149; A61H 2203/0425; A61H 2203/0431; A61H 2203/0437; A61H 2203/0443; A61H 2201/0103; A61H 2205/08; A61H 2205/081; A47C 23/047; A47C 27/08; A47C 27/081; A47C 27/082; A47C 27/083; A47C 27/084; A47C 27/085; A47C 27/086; A47C 27/087; A47C 27/088; A47C 27/10; A47C 27/128; A47C 27/18
See application file for complete search history.

(56) References Cited

U.S. PATENT DOCUMENTS

| | | | | |
|---|---|---|---|---|
| 2010/0207438 | A1* | 8/2010 | Inoue | A61H 1/0244 |
| | | | | 297/284.2 |
| 2011/0160627 | A1* | 6/2011 | Huang | A61H 7/004 |
| | | | | 601/46 |

FOREIGN PATENT DOCUMENTS

| | | | | |
|---|---|---|---|---|
| JP | 2000-060676 | * | 2/2000 | ...... A47C 7/14 |
| JP | 2000-60676 | A | 2/2000 | |
| JP | 2001-333952 | A | 12/2001 | |
| JP | 2001-340407 | * | 12/2001 | ...... A47C 7/46 |
| JP | 2001-340407 | A | 12/2001 | |
| JP | 2004-181153 | A | 7/2004 | |
| JP | 2005-87605 | A | 4/2005 | |
| JP | 2016-188058 | A | 11/2016 | |

OTHER PUBLICATIONS

International Search Report dated Jun. 28, 2016 in PCT/JP2016/060212 filed Mar. 29, 2016.
Office Action dated Apr. 2, 2019 in Japanese Patent Application No. 2015-088413 (with English translation).

* cited by examiner

Neutral

Fig.4B

Pull Down Cables
(Move Holding Member Upward)

Fig.4C

Pull Up Cables
(Move Holding Member Downward)

SEAT DEVICE

TECHNICAL FIELD

The present invention relates to a seat device.

BACKGROUND ART

Patent document 1 describes an example of a seat device including massaging airbags inflated and deflated at the inner side of a seat cover. The massaging airbags are supported by a movable plate, which is arranged inside a seatback. The movable plate is tilted to adjust the positions of the massaging airbags.

Patent document 2 describes an example of an air massaging device that moves massaging airbags, which are arranged in an open area within a base body, in the longitudinal direction of the base body with a driving device (moving mechanism). This allows the positions of the massaging airbag to be changed over a wide range while also allowing for fine adjustments.

PRIOR ART DOCUMENTS

Patent Documents

Patent Document 1: Japanese Laid-Open Patent Publication No. 2005-87605
Patent Document 2: Japanese Laid-Open Patent Publication No. 2001-340407

SUMMARY OF THE INVENTION

Problems that are to be Solved by the Invention

The position adjustment of the massaging airbags is often performed in a state in which the massaging airbags are receiving load from a vehicle occupant. Thus, when there are limitations on the dimensions and layout of the applicable driving device in a vehicle seat, it may be difficult to smoothly change the positions of the massaging airbags.

It is an object of the present invention to provide a seat device that allows for further smooth position adjustment of the massaging airbags.

Means for Solving the Problems

Accordingly, a seat device includes a first airbag inflated and deflated at an inner side of a seat cover, a holding member that holds the first airbag and is movable along an inner surface of the seat cover, a driving device that moves the holding member to change a position of the first airbag, and a second airbag that is independent from the first airbag and inflated at the inner side of the seat cover to press the seat cover and separate the seat cover from the first airbag.

BRIEF DESCRIPTION OF THE DRAWINGS

Figure 1:
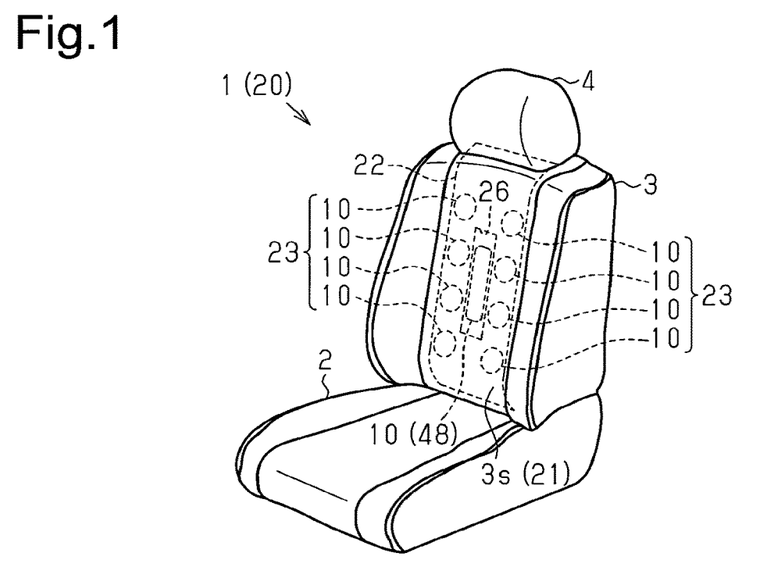
Figure 2:
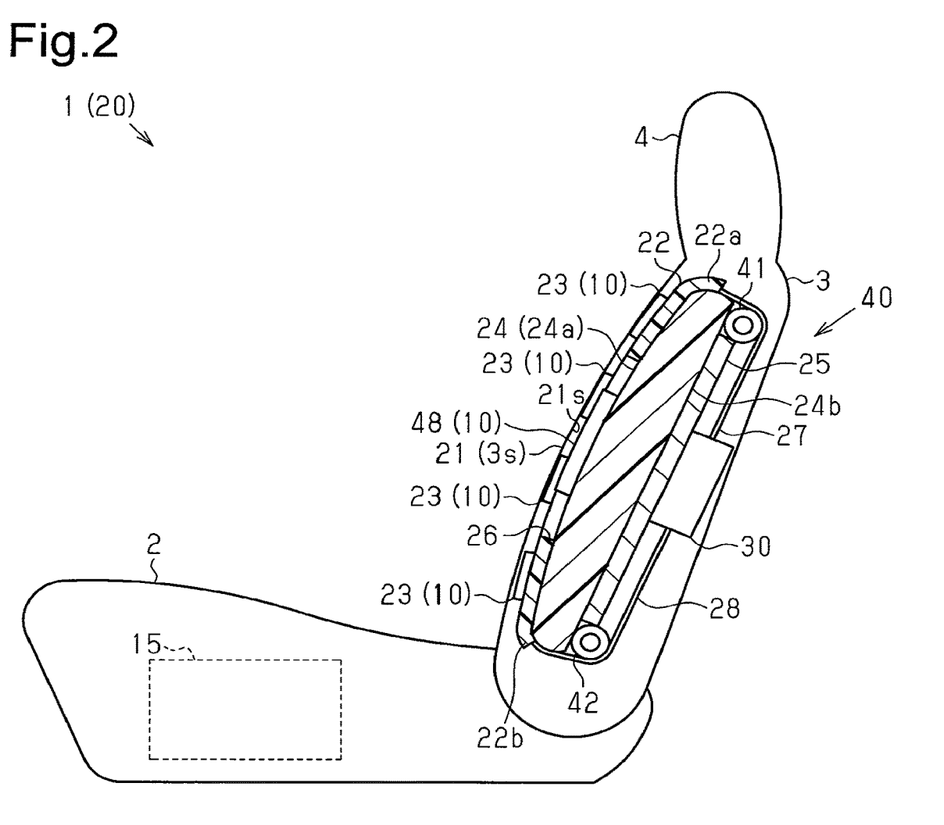
Figure 3:
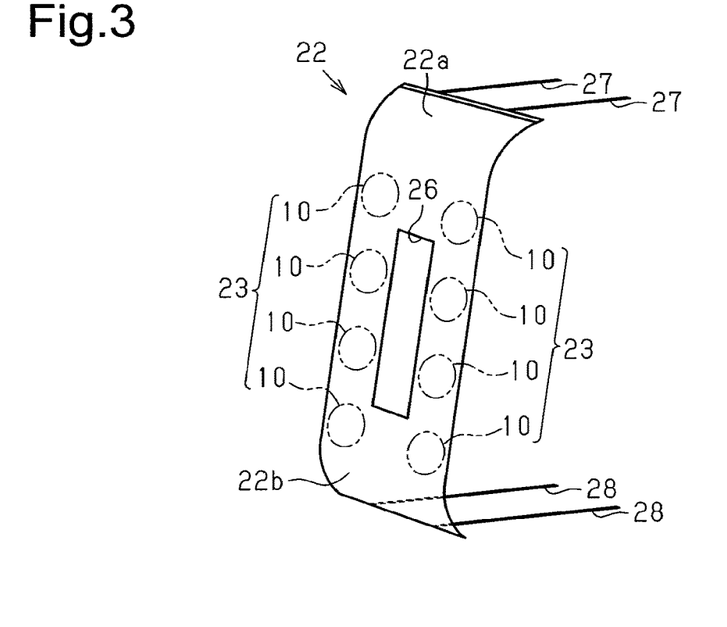
Figure 4A:
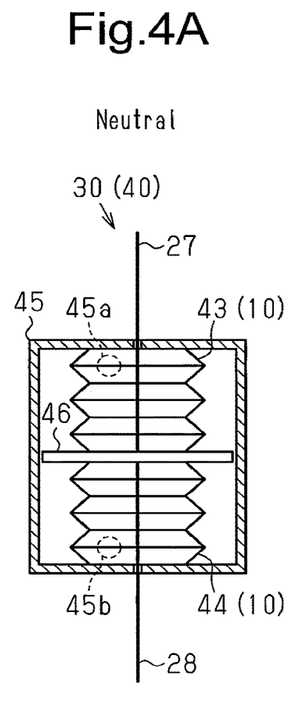
Figure 4B:
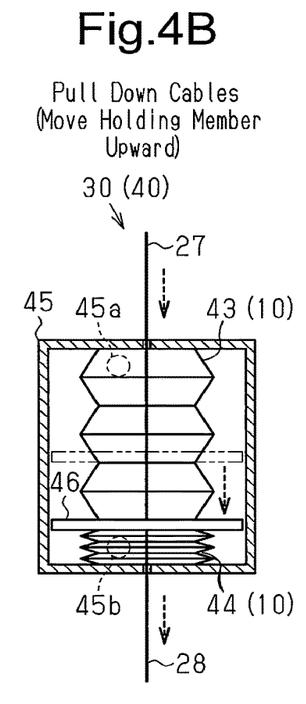
Figure 4C:
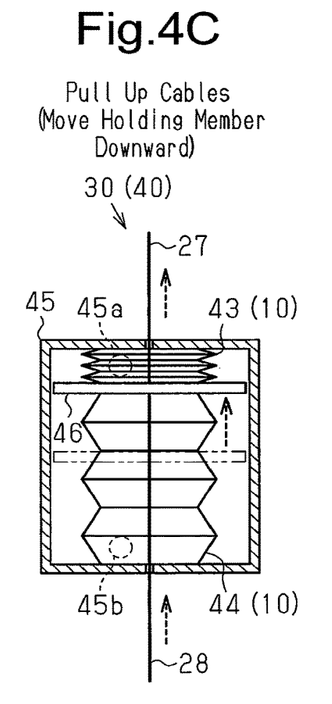
Figure 5:
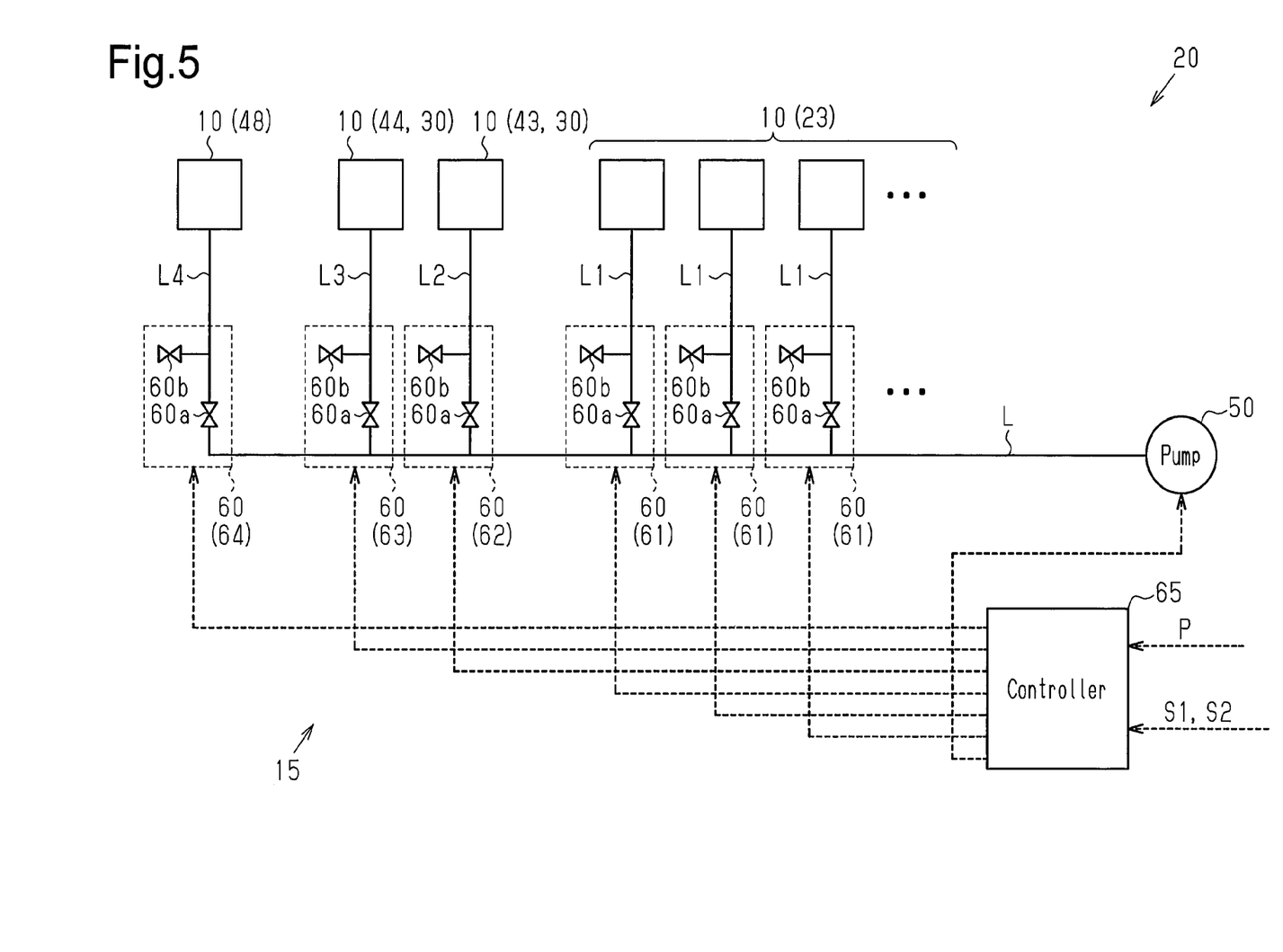
Figure 6:
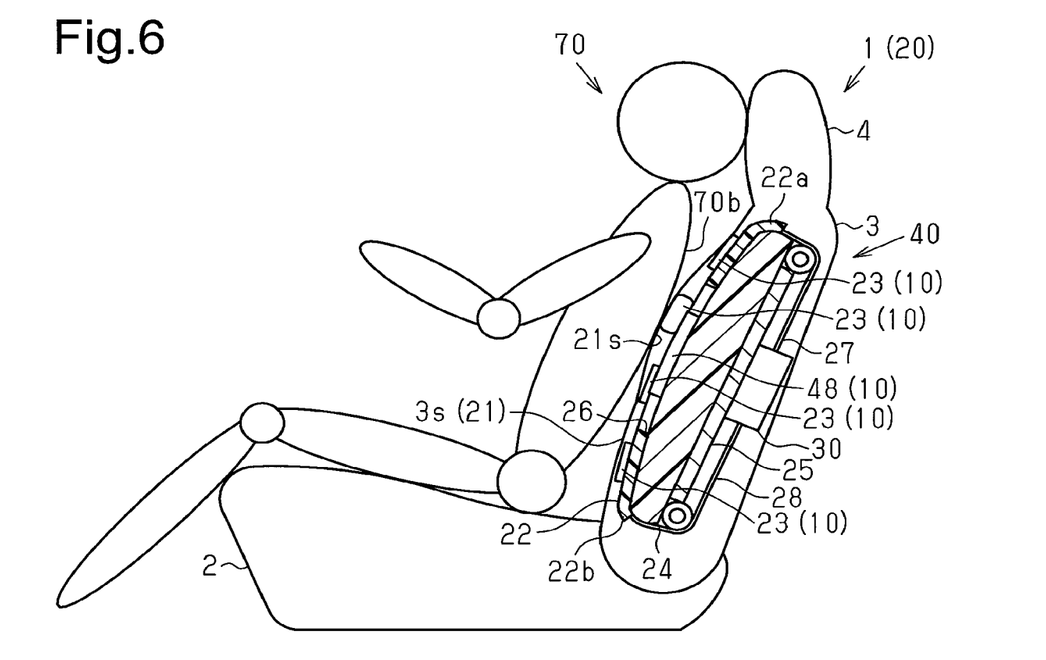
Figure 7:
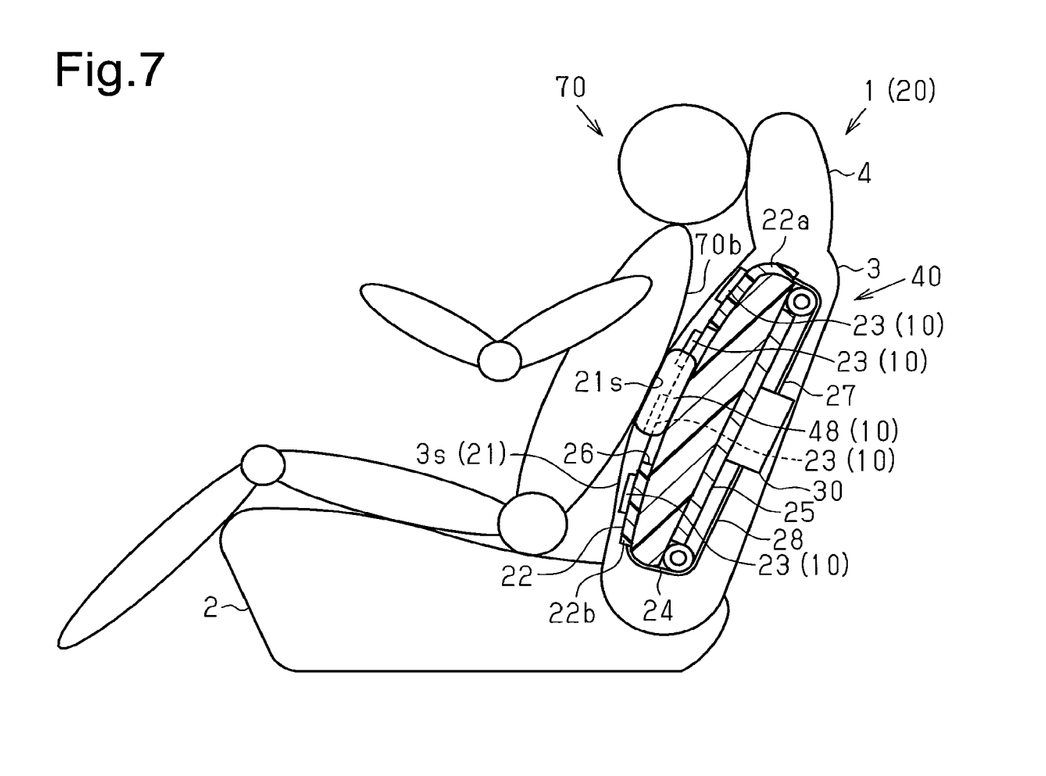
Figure 8:
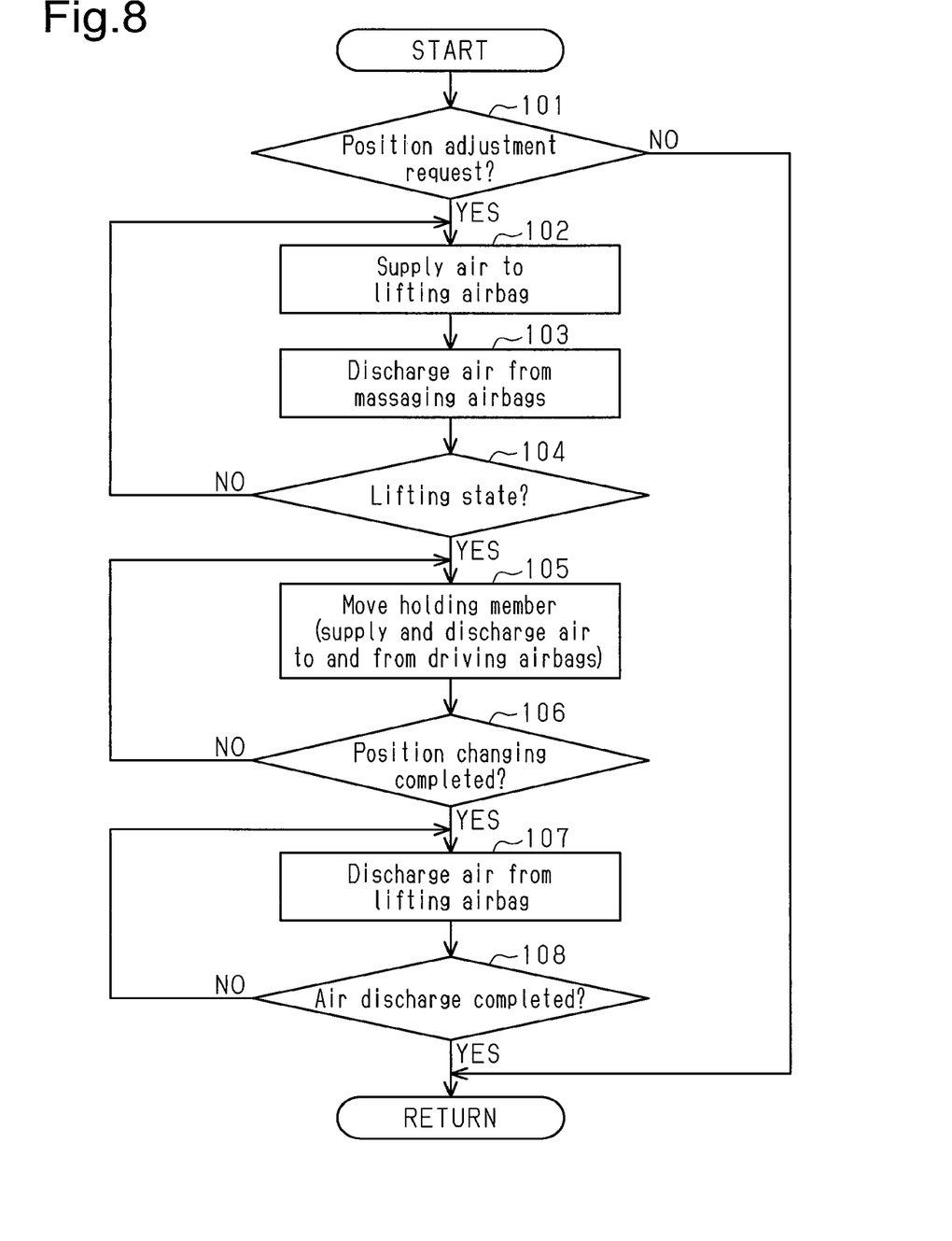
Figure 9:
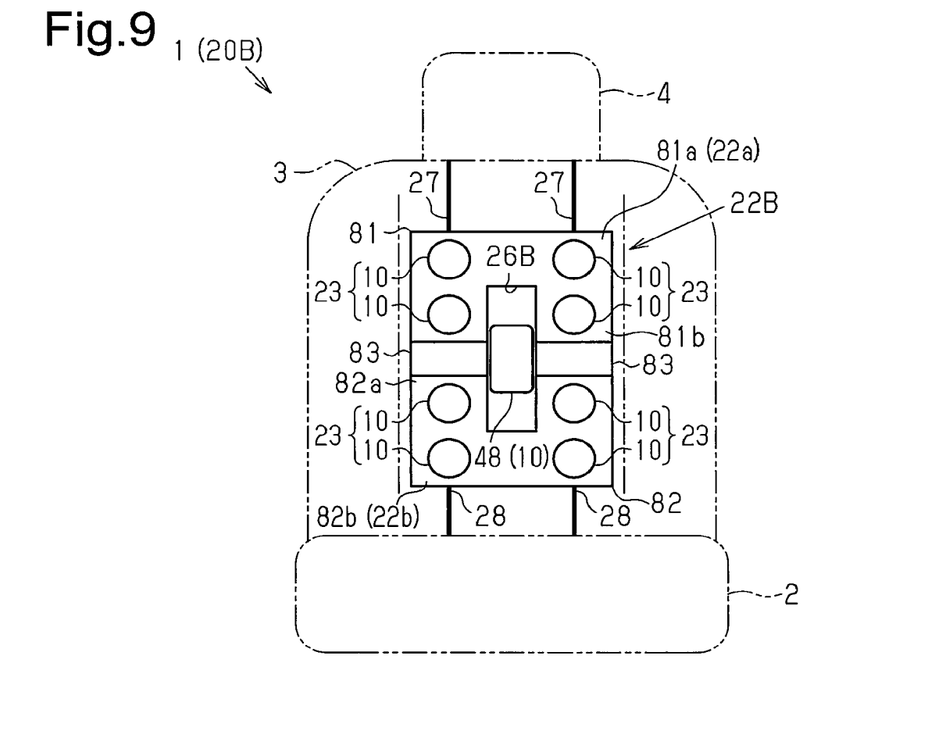
Figure 10:
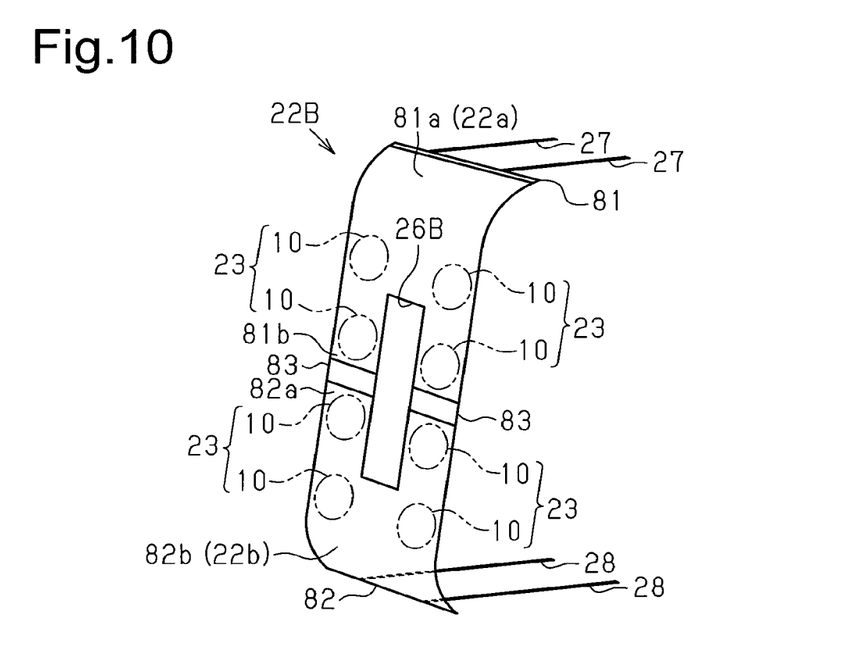
Figure 11:
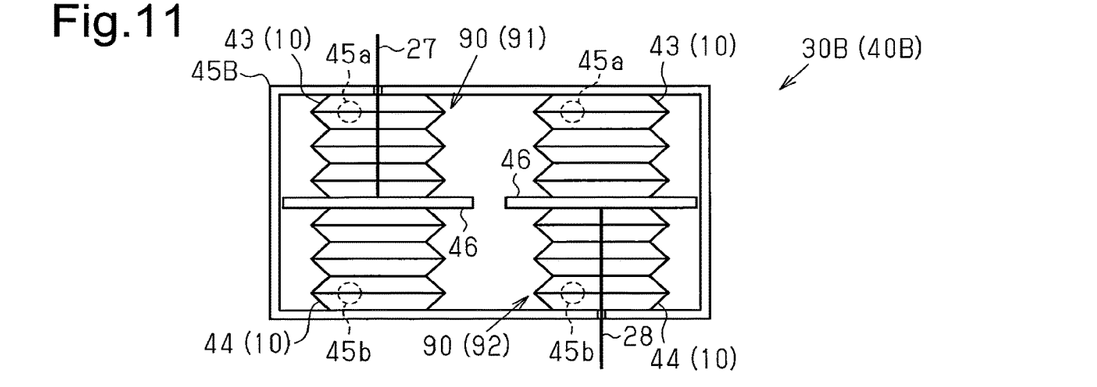
Figure 12A:
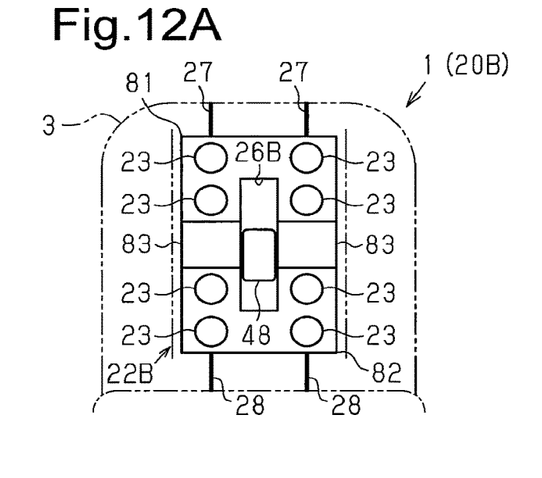
Figure 12B:
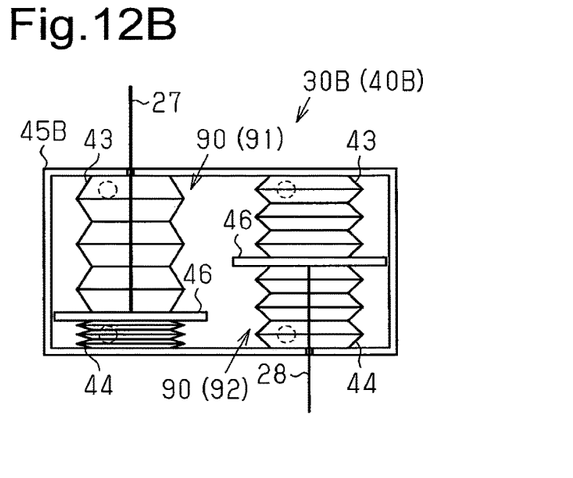
Figure 13A:
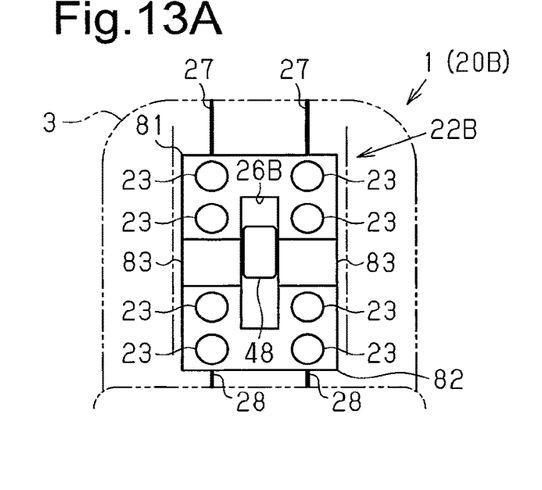
Figure 13B:
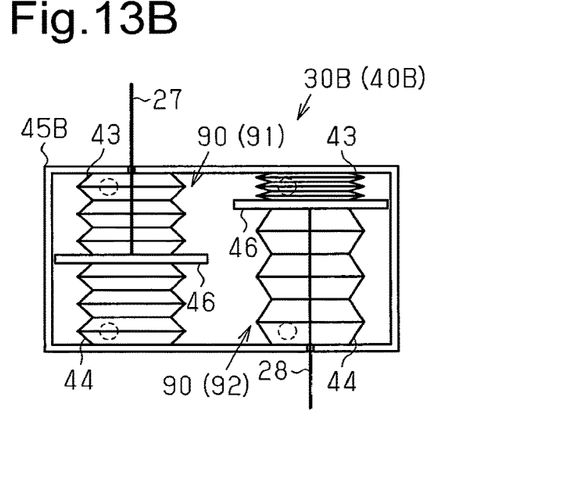
Figure 14A:
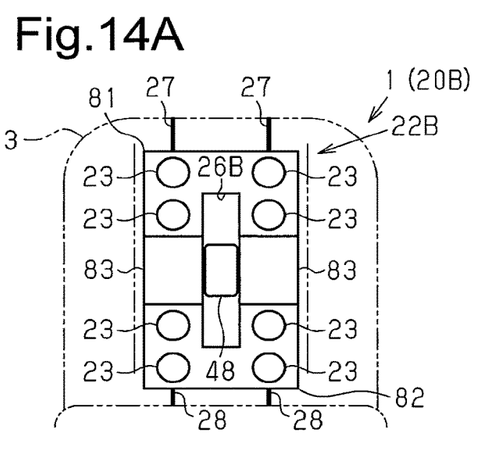
Figure 14B:
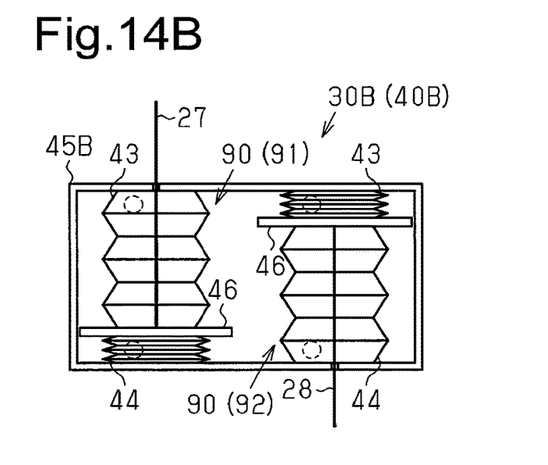
Figure 15A:
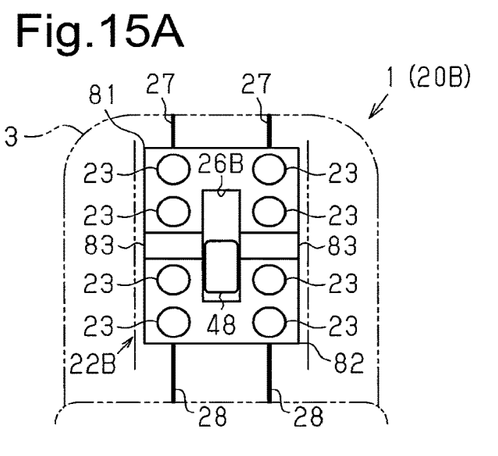
Figure 15B:
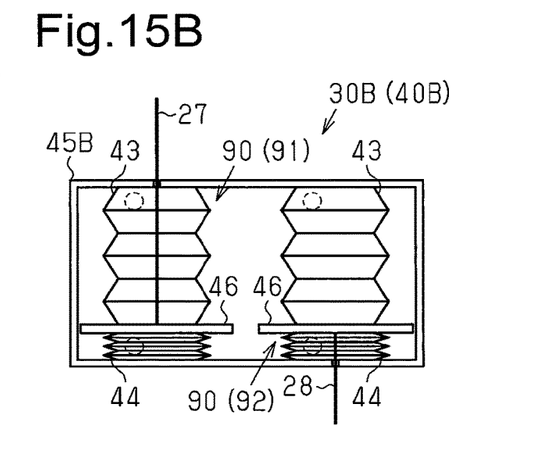
Figure 16A:
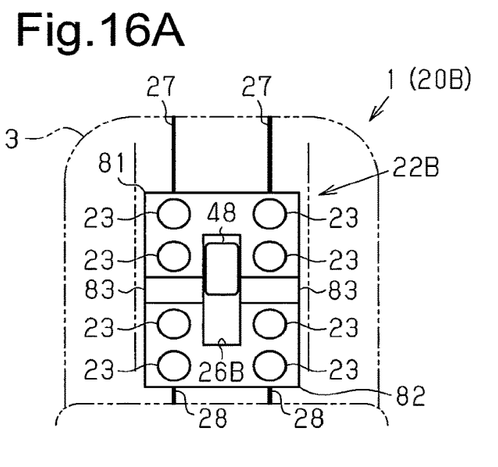
Figure 16B:
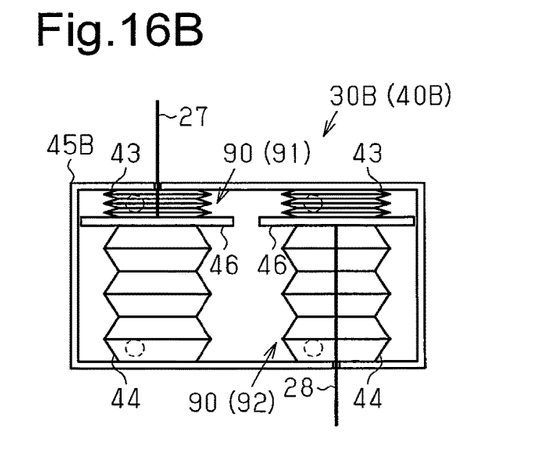

FIG. 1 is a perspective view of the seat device.
FIG. 2 is a schematic diagram of the seat device shown in FIG. 1.
FIG. 3 is a perspective view of a holding member in the seat device of FIG. 1.
FIGS. 4A to 4C are diagrams illustrating the action of an actuator in the seat device of FIG. 1.
FIG. 5 is a diagram illustrating the system configuration of the seat device shown in FIG. 1.
FIG. 6 is a diagram of the seat device shown in FIG. 1 during the execution of massaging control.
FIG. 7 is a diagram of the seat device shown in FIG. 1 during the execution of position-adjustment control.
FIG. 8 is a flowchart illustrating the processing procedures of the position-adjustment control in the seat device of FIG. 1.
FIG. 9 is a schematic diagram of a seat device in a second embodiment.
FIG. 10 is a perspective view of a holding member in the seat device shown in FIG. 9.
FIG. 11 is a schematic diagram of an actuator in the seat device of FIG. 9.
FIGS. 12A and 12B are diagrams illustrating the seat device of FIG. 9 when upper massaging airbags are upwardly moved.
FIGS. 13A and 13B are diagrams illustrating the seat device of FIG. 9 when lower massaging airbags are downwardly moved.
FIGS. 14A and 14B are diagrams illustrating the seat device of FIG. 9 when the upper massaging airbags are upwardly moved and the lower massaging airbags are downwardly moved.
FIGS. 15A and 15B are diagrams illustrating the seat device of FIG. 9 when the upper massaging airbags and the lower massaging airbags are both upwardly moved.
FIGS. 16A and 16B are diagrams illustrating the seat device of FIG. 9 when the upper massaging airbags and the lower massaging airbags are both downwardly moved.

EMBODIMENTS OF THE INVENTION

First Embodiment

A first embodiment of a seat device will now be described with reference to the drawings.

As shown in FIGS. 1 and 2, a vehicle seat 1 includes a seat cushion 2 and a seatback 3 arranged at the rear end of the seat cushion 2. A headrest 4 is arranged on the upper end of the seatback 3. In the seat 1, a plurality of airbags 10 are arranged in the seatback 3. Further, a supply-discharge device 15 is arranged in the seat cushion 2 to supply air to and discharge air from the airbags 10 in order to inflate and deflate the airbags 10. In the present embodiment, this forms a seat device 20 provided with a massaging function for pressing the back of a vehicle occupant with a backrest surface 3s of the seatback 3.

As shown in FIGS. 2 and 3, a holding member 22 is arranged at the inner side of a seat cover 21 forming the backrest surface 3s of the seatback 3. The holding member 22 is movable along an inner surface 21s of the seat cover 21. In the present embodiment, the holding member 22 has a sheet-like contour and extends along the inner surface 21s of the seat cover 21. In detail, the holding member 22 is substantially rectangular and elongated in the vertical direction of the seatback 3. The seat device 20 includes a plurality of massaging airbags 23 serving as first airbags and held by the holding member 22 at the inner side of the seat cover 21.

The holding member 22 is arranged between the inner surface 21s of the seat cover 21 and a seat pad 24, which serves as a cushion of the seatback 3. The seat pad 24 is fixed to a frame 25 of the seatback 3. The middle portion of the holding member 22 includes an elongated hole 26 that extends in the longitudinal direction of the holding member 22, that is, the vertical direction of the seatback 3. The holding member 22 holds a plurality of (four in the present embodiment) of the massaging airbags 23, which are arranged in the longitudinal direction of the holding member 22, at each of the two widthwise sides of the elongated hole 26.

The holding member 22 includes an upper end 22a that is connected to wire cables 27 and a lower end 22b that is connected to wire cables 28. The wire cables 27 are extended from the upper end of the seat pad 24 toward a rear surface 24b (right side as viewed in FIG. 2) of the seat pad 24, and the wire cables 28 are extended from the lower end of the seat pad 24 toward the rear surface 24b (right side as viewed in FIG. 2) of the seat pad 24. An actuator 30 that pulls the wire cables 27 and 28 is arranged on the rear surface 24b of the seat pad 24.

The wire cables 27 and 28, which are connected to the upper end 22a and the lower end 22b of the holding member 22, pull and slide the holding member 22 on a front surface 24a of the seat pad 24 to move the holding member 22 in the vertical direction of the seatback 3. This forms a driving device 40 that changes the positions of the massaging airbags 23 held by the holding member 22.

The holding member 22 is formed from a non-stretchable material. Further, the holding member 22 is flexible so that it can be curved along the curved form of the seat pad 24. The wire cables 27 and 28, which are connected to the upper end 22a and the lower end 22b of the holding member 22, are extended toward the rear surface 24b of the seat pad 24 via pulleys 41 and 42 arranged on the frame 25 of the seatback 3. The actuator 30 is supported by the frame 25 of the seatback 3 and arranged on the rear surface 24b of the seat pad 24.

As shown in FIGS. 4A to 4C, an air actuator actuated by pneumatic pressure is used as the actuator 30, which is an element of the driving device 40. More specifically, the actuator 30 includes two accordion-shaped driving airbags 43 and 44 that are expanded and contracted in accordance with changes in the internal pressure, a case 45 that holds the driving airbags 43 and 44 in series, and an actuation plate 46 held between the two driving airbags 43 and 44. The case 45 includes supply-discharge passages 45a and 45b that supply and discharge internal air to and from the driving airbags 43 and 44. The wire cables 27 and 28 connected to the upper end 22a and the lower end 22b of the holding member 22 each include an end connected to the actuation plate 46 of the actuator 30.

As shown in FIG. 4A, the actuator 30 is configured to hold the actuation plate 46 between the two driving airbags 43 and 44 at a neutral position when the driving airbags 43 and 44 held in the case 45 are both in the same inflation state (deployed state). In this manner, the seat device 20 is configured so that the massaging airbags 23 held by the holding member 22 are located at an initial position (refer to FIGS. 1 and 2) when the actuation plate 46 of the actuator 30 is located at the neutral position.

As shown in FIG. 4B, the actuator 30 is configured to move the actuation plate 46 in the case 45 by inflating the upper driving airbag 43 and deflating the lower driving airbag 44. In this manner, the seat device 20 is configured to upwardly move the holding member 22 and the massaging airbags 23 when the actuator 30 pulls down the wire cables 27 connected to the upper end 22a of the holding member 22.

As shown in FIG. 4C, the actuator 30 is configured to move the actuation plate 46 upward by inflating the lower driving airbag 44 and deflating the upper driving airbag 43. In this manner, the seat device 20 is configured to downwardly move the holding member 22 and the massaging airbags 23 when the actuator 30 pulls up the wire cables 28 connected to the lower end 22b of the holding member 22.

As shown in FIGS. 1 and 2, the seat device 20 includes a lifting airbag 48 serving as a second airbag and arranged independently from the massaging airbags 23, which are held by the holding member 22. In the present embodiment, the lifting airbag 48 is supported by the seat pad 24 and arranged in the elongated hole 26, which extends through the middle portion of the holding member 22. The lifting airbag 48 is inflated (deployed) when supplied with air to press the seat cover 21, which forms the backrest surface 3s of the seatback 3, from the inner side (press from right side as viewed in FIG. 2). In this manner, the seat device 20 is configured to separate the massaging airbags 23, which are held by the holding member 22, from the seat cover 21.

As shown in FIG. 5, the seat device 20 includes a pump device 50 that forcibly sends air to the airbags 10 (23, 43, 44, 48) arranged inside the seatback 3. An air supply passage L connected between the airbags 10 and the pump device 50 includes a plurality of valve devices 60. More specifically, the seat device 20 includes valve devices 61 to 64 arranged independently in an air supply passage L1 for the massaging airbags 23, air supply passages L2 and L3 for the driving airbags 43 and 44 of the actuator 30, and an air supply passage L4 for the lifting airbag 48. The pump device 50 and the valve devices 60 (61 to 64) are actuated under the control of a controller 65. This forms the supply-discharge device 15 of the airbags 10 in the seat device 20.

Each valve device 60 includes a supply valve 60a, which can stop the supply of air from the pump device 50, and a discharge valve 60b, which can discharge air out of the airbag 10. The supply-discharge device 15 can supply and discharge air to and from the airbags 10 through the air supply passages L1 to L4 of the valve devices 60 (61 to 64) based on the actions of each supply valve 60a and each discharge valve 60b combined with the action of the pump device 50.

When supplying air to each airbag 10, the controller 65 drives the pump device 50 and also opens the supply valve 60a and closes the discharge valve 60b of the valve device 60 arranged in the air supply passage L (L1 to L4) of the airbag 10 that is to be supplied with air. When discharging air from each airbag 10, the controller 65 closes the supply valve 60a and opens the discharge valve 60b of the valve device 60 arranged in the air supply passage L of the airbag 10 from which air is to be discharged.

An operation switch (not shown) arranged on the seat 1 is operated to input a massaging request signal S1, which indicates the use of the massaging function, and an operation input signal S2, which is for performing position adjustment of the massaging airbags 23, to the controller 65.

When receiving the massaging request signal S1, the controller 65 controls the actuation of the valve devices 61 in the air supply passages L1 to repetitively inflate and deflate the massaging airbags 23. More specifically, the internal pressure P of each airbag 10 is input to the controller 65. During the execution of massaging control, the controller 65 controls the actuation of the pump device 50 configuring the supply-discharge device 15 and the actuation of the valve devices 61 arranged in the air supply passages L1 to increase and decrease the internal pressure P of each massaging airbag 23 between a preset first specified pressure and second specified pressure. In this manner, the seat device 20 applies intermittent pressing force to the back of the vehicle occupant that is in contact with the backrest surface 3s of the seatback 3.

When receiving the operation input signal S2 that requests for position adjustment of the massaging airbags 23, the controller 65 controls the actuation of the valve devices 62 and 63 arranged in the air supply passages L2 and L3 of the driving airbags 43 and 44 configuring the actuator 30 of the driving device 40.

When upwardly moving the massaging airbags 23, the controller 65 inflates the upper driving airbag 43 and deflates the lower driving airbag 44 (refer to FIG. 4B) so that the actuator 30 pulls the wire cables 27 connected to the upper end 22a of the holding member 22. When downwardly moving the massaging airbags 23, the controller 65 inflates the lower driving airbag 44 and deflates the upper driving airbag 43 (refer to FIG. 4C) so that the actuator 30 pulls the wire cables 28 connected to the lower end 22b of the holding member 22.

The controller 65 controls the actuation of the valve device 64 arranged in the air supply passage L4 to inflate the lifting airbag 48 before actuating the actuator 30 of the driving device 40, that is, before the executing the supply-discharge control of the driving airbags 43 and 44. This allows the seat device 20 to smoothly change the positions of the massaging airbags 23.

As shown in FIG. 6, the seat device 20 is configured to apply massaging pressing force to the back 70b of a vehicle occupant 70 through the backrest surface 3s of the seatback 3 by deploying the massaging airbags 23 at the inner side of the seat cover 21. In other words, the load of the vehicle occupant 70 using the massaging function is applied to the massaging airbags 23 through the seat cover 21 forming the backrest surface 3s of the seatback 3. When changing the positions of the massaging airbags 23 in this state, driving force is required to move the massaging airbags 23 and the holding member 22 against the load applied by the vehicle occupant.

In this regard, as shown in FIG. 7, the seat device 20 inflates the lifting airbag 48 before changing the positions of the massaging airbags 23. More specifically, the seat device 20 inflates the lifting airbag 48 and presses the seat cover 21 from the inner side to separate the seat cover 21, which forms the backrest surface 3s of the seatback 3, from the massaging airbags 23. The seat device 20 moves the holding member 22 in this state. This allows the seat device 20 to be configured to allow position-adjustment of the massaging airbags 23 to be smoothly performed with a smaller driving force.

Referring to the flowchart of FIG. 8, when the controller 65 receives the operation input signal S2 that requests for position adjustment of the massaging airbags 23 (step 101: YES), the controller 65 executes an air supply control on the lifting airbag 48 (step 102) and executes an air discharge control on the massaging airbags 23 (step 103). Then, the controller 65 determines whether or not the lifting airbag 48, which has been inflated by the air supply control executed on the lifting airbag 48 in step 102, is pushing the seat cover 21 from the inner side, that is, the controller 65 determines whether or not the lifting airbag 48 is in a lifting state and separating the seat cover 21 from the massaging airbags 23 (step 104). As long as the controller 65 determines in step 104 that the lifting airbag 48 is not in the lifting state (step 104: NO), the controller 65 continues to execute the air supply control on the lifting airbag 48 in step 103 and the air discharge control on the massaging airbags 23 in step S103.

When the controller 65 determines in step 104 that the lifting airbag 48 is in the lifting state (step 104: YES), the controller 65 executes a drive control on the holding member 22 when receiving the operation input signal S2 that requests for position adjustment of the massaging airbags 23 (step 105). Then, the controller 65 determines whether or not the changing of the positions of the massaging airbags 23 through the drive control of the holding member 22 has been completed (step 106).

The drive control of the holding member 22 in step 105 is executed by performing the supply-discharge control on the driving airbags 43 and 44 of the actuator 30 configuring the driving device 40 (refer to FIG. 4). The position-changing end determination in step 106 is made when, for example, the operation input signal S2, which requests for the position adjustment of the massaging airbags 23, is no longer received. As long as the controller 65 determines in step 106 that the position-changing of the massaging airbags 23 has not been completed (step 106: NO), the controller 65 continues to execute the drive control on the holding member 22 in step 105.

When the controller 65 determines in step 106 that the position-changing of the massaging airbags 23 has been completed (step 106: YES), the controller 65 executes an air discharge control on the lifting airbag 48 (step 107). Then, the controller 65 determines whether or not the air discharge from the lifting airbag 48 has been completed, that is, the controller 65 determines whether or not the lifting airbag 48 has been deflated to a level at which it no longer presses the inner surface 21s of the seat cover 21 (step 108). The controller 65 is configured to return to a massaging control that uses the massaging airbags 23 after determining that the air discharge from the lifting airbag 48 has been completed (step 108: YES).

As long as the controller 65 does not determine in step 108 that the air discharge from the lifting airbag 48 has not been completed (step 108: NO), the controller 65 continues the air discharge control on the lifting airbag 48. When determining in step 101 that there is no position adjustment request for the massaging airbags 23 in step 101 (step 101: NO), the controller 65 does not perform steps 102 to 108.

The present embodiment has the advantages described below.

(1) The seat device 20 includes the massaging airbags 23 (first airbags), which is inflated and deflated at the inner side of the seat cover 21, and the holding member 22, which holds the massaging airbags 23 and is movable along the inner surface 21s of the seat cover 21. Further, the seat device 20 includes the driving device 40 that moves the holding member 22 to change the positions of the massaging airbags 23. The seat device 20 includes the lifting airbag 48 (second airbag), which is held by the holding member 22 and independent from the massaging airbags 23. The lifting airbag 48 is inflated at the inner side of the seat cover 21 to press the seat cover 21 and separate the massaging airbags 23 from the seat cover 21.

With the above structure, the lifting airbag 48 receives the load applied by the vehicle occupant to the seat cover 21 so that the massaging airbags 23, which are held by the holding member 22 and located at the inner side of the seat cover 21, can be moved in a low-load state. Further, the lifting airbag 48 that presses the seat cover 21 from the inner side ensures comfortable seating when the movement of the holding member 22 changes the positions of the massaging airbags 23. As a result, the position adjustment of the massaging airbags 23 can be performed further smoothly. Further, since the holding member 22 can be moved with a smaller driving force, the driving device can be reduced in size and weight. This improves the applicability of the driving device to the vehicle seat 1.

(2) The middle portion of the holding member 22 includes the elongated hole 26 that extends in the longitudinal direction of the holding member 22. The seat device 20 includes the massaging airbags 23 held by the holding member 22 at the two widthwise sides of the elongated hole 26. The lifting airbag 48 is held in the elongated hole 26 of the holding member 22.

With the above structure, the lifting airbag 48 is arranged between at least two of the massaging airbags 23. Thus, inflation (deployment) of the lifting airbag 48 stably separates the seat cover 21 from the massaging airbags 23. As a result, position adjustment of the massaging airbags 23 can be performed further smoothly.

(3) The holding member 22 is sheet-like and extends along the inner surface 21s of the seat cover 21. This eliminates the need for a special structure like in the prior art that uses, for example, a recess formed in the seat pad 24 serving as a cushion to move the holding member 22 at the inner side of the seat cover 21. Thus, the structure of the seat device 20 is simplified, and comfortable seating is ensured.

(4) The driving device 40 includes the wire cables 27 and 28, which are connected to the upper end 22a and the lower end 22b of the holding member 22, and the actuator 30, which pulls the wire cables 27 and 28.

With the above structure, the driving device 40 is configured to pull the ends of the holding member 22. This improves the degree of freedom for the layout of the driving device 40. Thus, the applicability of the driving device 40 to the vehicle seat 1 can be improved.

(5) An air actuator driven by pneumatic pressure is used as the actuator 30 of the driving device 40. Thus, actuation of the driving device 40 can be controlled with the supply-discharge device 15 that is shared by the massaging airbags 23 and the lifting airbag 48. This simplifies the structure of the driving device 40.

(6) The driving device 40 (more specifically, controller 65) moves the holding member 22 in a state in which the massaging airbags 23 are deflated. This limits interference of the massaging airbags 23 with the seat cover 21. As a result, movement of the holding member 22 smoothly and readily changes the positions of the massaging airbags 23.

Second Embodiment

A second embodiment of the seat device will now be described. Same reference numerals are given to those components that are the same as the corresponding components of the first embodiment. Such components will not be described.

As shown in FIGS. 9 and 10, a seat device 20B of the second embodiment includes a holding member 22B that differs from the holding member 22 of the seat device 20 in the first embodiment.

The holding member 22B of the second embodiment includes a first holding element 81 located at an upper side, a second holding element 82 located at a lower side, and an elastic member 83 located between the first holding element 81 and the second holding element 82. In the same manner as the holding member 22 of the first embodiment, the first holding element 81 and the second holding element 82 are formed by a sheet of a non-stretchable material. The elastic member 83 is freely stretched and formed from an elastic material such as rubber. The elastic member 83 is also sheet-like in the same manner as the first holding element 81 and the second holding element 82.

The first holding element 81 includes an upper end 81a (corresponding to the upper end 22a of holding member 22B) connected to the wire cables 27, and the second holding element 82 includes a lower end 82b (corresponding to lower end 22b of holding member 22B) connected to the wire cables 28. Further, the elastic member 83 is located between a lower end 81b of the first holding element 81 and an upper end 82a of the second holding element 82. Like the holding member 22 in the first embodiment, the holding member 22B in the second embodiment is substantially rectangular and elongated in the vertical direction of the seatback 3. Further, the middle portion of the holding member 22B includes an elongated hole 26B.

The elongated hole 26B divides the elastic member 83 into left and right parts. Further, the elongated hole 26B is formed so as to cut away the lower end 81b of the first holding element 81 and the upper end 82a of the second holding element 82. The elastic member 83 connects the first holding element 81 and the second holding element 82. The first holding element 81 holds a plurality of (two in the present embodiment) massaging airbags 23 in the longitudinal direction at each of the two opposite sides of the cutaway portion of the elongated hole 26B. The second holding element 82 holds a plurality of (two in the present embodiment) massaging airbags 23 in the longitudinal direction at each of the two opposite sides of the cutaway portion of the elongated hole 26B. The seat device 20B also includes the lifting airbag 48 arranged in the elongated hole 26B at the middle portion of the holding member 22B.

Further, as shown in FIG. 11, the seat device 20B of the second embodiment includes an actuator 30B that differs from the actuator 30 in the seat device 20 of the first embodiment.

The actuator 30B, which is an element of the driving device 40B, includes two independent driving airbag pairs 90, namely, a first driving airbag pair 91 and a second driving airbag pair 92. Each driving airbag pair 90 includes the two accordion-shaped driving airbags 43 and 44, which are expanded and contracted in accordance with changes in the internal pressure and arranged in series, and the actuation plate 46, which is held between the two driving airbags 43 and 44. The wire cables 27 connect the actuation plate 46 of the first driving airbag pair 91 and the upper end 81a of the first holding element 81. The wire cables 28 connect the actuation plate 46 of the second driving airbag pair 92 and the lower end 82b of the second holding element 82.

The actuator 30B of the second embodiment upwardly pulls the first holding element 81 with the first driving airbag pair 91 and downwardly pulls the second holding element 82 with the second driving airbag pair 92. Further, the elastic member 83 held between the first holding element 81 and the second holding element 82 is elastically deformed (stretched) to allow for relative movement of the first holding element 81 and the second holding element 82. This allows the positions of the massaging airbags 23 held by the first holding element 81 to be changed independently from the positions of the massaging airbags 23 that are held by the second holding element 82. The massaging airbags 23 held by the first holding element 81 may be referred to as the upper massaging airbags 23, and the massaging airbags 23 held by the second holding element 82 may be referred to as the lower massaging airbags 23.

Referring to FIGS. 12A and 12B, when upwardly moving the upper massaging airbags 23 that are located at a shoulder region (upper region) of the seatback 3, the first driving airbag pair 91 of the actuator 30B pulls the first holding element 81 that holds the upper massaging airbags 23. More specifically, the upper driving airbag 43 of the first driving airbag pair 91 is inflated, and the lower driving airbag 44 of the first driving airbag pair 91 is deflated. The actuation plate 46 held between the two driving airbags 43 and 44 pulls down the wire cables 27 connected to the upper end of the first holding element 81 to upwardly move the first holding element 81 and the upper massaging airbags 23 held by the first holding element 81.

Here, the driving airbags 43 and 44 of the second driving airbag pair 92 are both kept in the same inflation state to hold the actuation plate 46 held between the two driving airbags 43 and 44 at the neutral position. More specifically, downward pulling of the wire cables 28 connected to the actuation plate 46 of the second driving airbag pair 92 is limited to restrict upward movement of the second holding element 82 connected to the second driving airbag pair 92 by the wire cables 28. In this manner, the seat device 20B of the second embodiment allows the first holding element 81 and the upper massaging airbags 23, which are held by the first holding element 81, to be upwardly moved without changing the positions of the lower massaging airbags 23, which are held by the second holding element 82 and located at a waist region (lower region) of the seatback 3. In other words, the upper massaging airbags 23 can be moved to upward positions in a state in which the lower massaging airbags 23 are held at initial positions.

In this manner, when upwardly moving only the first holding element 81 in a state in which upward movement of the second holding element 82 is restricted, the elastic member 83, which is located between the first holding element 81 and the second holding element 82, is stretched by the pulling force that upwardly moves the first holding element 81. In this case, the elastic member 83 functions as an urging member that urges the first holding element 81 in a direction opposite to the pulling direction of the first driving airbag pair 91 of the actuator 30B. In the seat device 20B of the second embodiment, the urging force produced by the elastic member 83 allows the first holding element 81 and the upper massaging airbags 23, which are held by the first holding element 81, to be returned to initial positions from the upward positions to where the first holding element 81 and the upper massaging airbags 23 were pulled by the actuator 30B (refer to FIG. 10).

More specifically, the upper driving airbag 43 is deflated and the lower driving airbag 44 is inflated in the first driving airbag pair 91 so that the driving airbags 43 and 44 are both in the same inflation state. In the seat device 20B of the second embodiment, this upwardly pulls the wire cables 27 connected to the actuation plate 46 of the first driving airbag pair 91 so that the elastic force (elastic restoration force) of the elastic member 83, which is held between the first holding element 81 and the second holding element 82 downwardly moves the first holding element 81 and the upper massaging airbags 23, which are held by the first holding element 81.

Referring to FIGS. 13A and 13B, when downwardly moving the lower massaging airbags 23 that are located at a lower region of the seatback 3, the second driving airbag pair 92 of the actuator 30B pulls the second holding element 82 that holds the lower massaging airbags 23. Here, the driving airbags 43 and 44 of the first driving airbag pair 91 connected to the first holding element 81 are both kept in the same inflation state to restrict downward movement of the first holding element 81. This allows the second holding element 82 and the lower massaging airbags 23, which are held by the second holding element 82, to be downwardly moved without changing the positions of the upper massaging airbags 23, which are held by the first holding element 81 and located at the upper region of the seatback 3. In other words, the lower massaging airbags 23 can be moved to downward positions in a state in which the upper massaging airbags 23 are held at initial positions.

Further, when returning the second holding element 82 and the lower massaging airbags 23, which are held by the second holding element 82, to the initial positions, the upper driving airbag 43 is inflated and the lower driving airbag 44 is deflated in the second driving airbag pair 92 so that the driving airbags 43 and 44 are both in the same inflation state. In this manner, the seat device 20B of the second embodiment downwardly pulls the wire cables 28 connected to the actuation plate 46 of the second driving airbag pair 92 to upwardly move the second holding element 82 and the lower massaging airbags 23, which are held by the second holding element 82, with the elastic force of the elastic member 83, which is located between the first holding element 81 and the second holding element 82.

Referring to FIGS. 14A and 14B, the driving airbag pairs 90 (91 and 92) of the actuator 30B respectively pull the first holding element 81 and the second holding element 82 to move the first holding element 81 and the second holding element 82 away from each other in the vertical direction. The seat device 20B can independently move the upper massaging airbags 23 and the lower massaging airbags 23.

When returning the upper massaging airbags 23 and the lower massaging airbags 23 to the initial positions, supply-discharge control is performed on the driving airbag pairs 90 (91 and 92) of the actuator 30B so that the corresponding driving airbags 43 and 44 are both in the same inflation state. Thus, the seat device 20B downwardly moves the first holding element 81 and upwardly moves the second holding element 82 with the elastic force of the elastic member 83 located between the first holding element 81 and the second holding element 82.

Further, with reference to FIGS. 15A, 15B, 16A, and 16B, in the second embodiment, the two driving airbag pairs (91 and 92) of the actuator 30B are actuated in synchronism so that the first holding element 81 and the second holding element 82, which are connected to each other by the elastic member 83, are integrally actuated as a single holding member 22B. More specifically, as shown in FIGS. 15A and 15B, the holding member 22B is upwardly moved by allowing the first driving airbag pair 91 to pull the wire cables 27, which are connected to the first holding element 81, and the second driving airbag pair 92 to pull the wire cables 28, which are connected to the second holding element 82. As shown in FIGS. 16A and 16B, the holding member 22B is downwardly moved by allowing the second driving airbag pair 92 to pull the wire cables 28, which are connected to the second holding element 82, and the first driving airbag pair 91 to pull the wire cables 27, which are connected to the first holding element 81. In this manner, the seat device 20B can integrally move the upper massaging airbags 23 and the lower massaging airbags 23.

The second embodiment has the advantages described below.

The holding member 22B includes the first holding element 81, which is upwardly pulled by the driving device 40B, the second holding element 82, which is downwardly moved by the driving device 40B, and the elastic member 83, which is held between the first holding element 81 and the second holding element 82.

With the above structure, the elastic member 83 is elastically deformed (stretched) to allow for relative movement of the first holding element 81 and the second holding element 82. As a result, the positions of the upper massaging airbags 23 that are held by the first holding element 81 can be changed independently from the positions of the lower massaging airbags 23 that are held by the second holding element 82. This enlarges the position adjustment ranges of the upper massaging airbags 23 and the lower massaging airbags 23 and improves the convenience of the user.

Further, when changes in the upper massaging airbags 23 and the lower massaging airbags 23 result from relative movement of the first holding element 81 and the second holding element 82, the first holding element 81 and the second holding element 82 can be moved by the elastic force of the elastic member 83 located between the first holding element 81 and the second holding element 82. For example, the elastic member 83 functions as an urging member that urges the first holding element 81 and the second holding element 82 in a direction opposite to the direction in which the actuator 30B pulls the first holding element 81 (toward upper side) and the direction in which the actuator 30B pulls the second holding element 82 (toward lower side). This facilitates the structure of the driving device 40B.

Each of the above embodiments may be modified as described below.

In each of the above embodiments, the massaging airbags 23 are arranged at the inner side of the seat cover 21 that forms the backrest surface 3s of the seatback 3. Instead, massaging airbags may be arranged at the inner side of the seat cover 21 that forms a seat member other than the seatback 3 such as the seat cushion 2, the headrest 4, an ottoman, or an armrest.

In each of the above embodiments, the middle portion of the holding member 22 (22B) includes the elongated hole 26 (26B) that extends in the longitudinal direction of the holding member 22. The lifting airbag 48, which serves as the second airbag, is arranged in the elongated hole 26 (26B). However, the position of the lifting airbag 48 may be changed to any location as long as the inflated lifting airbag 48 can push the seat cover 21 away from the massaging airbags 23. The seat device 20 may include a plurality of lifting airbags 48.

In each of the above embodiments, the holding member 22 (first holding element 81 and second holding element 82 of holding member 22B) is formed from a sheet of a non-stretchable material to extend along the inner surface 21s of the seat cover 21. However, the material and shape of the holding member 22 may be changed in any manner. The holding member 22 may be formed from a stretchable material such as an elastic material like rubber. The holding member 22 does not necessarily have to be flexible so as to allow for curving deformation.

In each of the above embodiments, an air actuator actuated by pneumatic force is used as the actuator 30 (30B) of the driving device 40 (40B). Instead, for example, an electric actuator that uses a motor as a drive source may be used as the actuator 30 (30B). The driving device 40 (40B) may include a plurality of actuators.

In each of the above embodiments, the actuator 30 (30B) pulls the upper end 22a (upper end 81a of first holding element 81) and the lower end 22b (lower end 82b of second holding element 82) of the holding member 22 (22B) with the wire cables 27 and 28. However, for example, belt drive or the like may be employed instead to transmit the driving force. The driving method does not necessarily have to be a pulling method.

In each of the above embodiments, the holding member 22 (22B) is moved in a state in which the massaging airbags 23 are deflated. Instead, the holding member 22 (22B) may be moved in a state in which the massaging airbags 23 are inflated or in a state in which the massaging airbags 23 are inflated and deflated. This allows massaging to be restarted as soon as the positions of the massaging airbags 23 are changed.

In each of the above embodiments, the holding member 22 (22B) moves in the vertical direction of the seatback 3. Instead, the holding member 22 (22B) may be configured to be moved in the widthwise direction of the seat.

In the second embodiment, the elastic member 83 expanded by the first holding element 81 and the second holding element 82 functions as an urging member that urges the first holding element 81 and the second holding element 82 in a direction opposite to the direction in which the first holding element 81 is pulled (toward upper side) and the direction in which the second holding element 82 is pulled (toward lower side). However, the urging direction of the first holding element 81 and the second holding element 82 does not necessarily have to be opposite to the pulling direction of the actuator 30B. For example, when an elastic member is compressed in correspondence with a driving direction of a driving device, a holding member may be urged in a direction opposite to the compression direction.

In the second embodiment, the seat device 20B includes the first holding element 81 and the second holding element 82 that are connected to the elastic member 83. However, the seat device 20B may include three or more holding members that are connected by the elastic member 83.

An elastic member arranged between holding members does not necessarily have to function as an urging member. For example, an elastic member having one end connected to the seat pad 24 or the frame 25 may function as an urging member that urges a holding member in a direction opposite to the direction in which a driving device moves a holding member. Further, the urging member may be configured by any elastic member such as a tension spring or a compression spring. Such an urging member including a fixing end may be used together with an elastic member arranged between holding members to function as an urging member.

In the second embodiment, the actuator 30B holds the two independently arranged driving airbag pairs 90 (91 and 92) in a case 45B. However, the first driving airbag pair 91 and the second driving airbag pair 92 may each form an independent actuator.

Technical concepts that can be recognized from the above embodiments will now be described.

(A) A seat device characterized in that an air actuator actuated by pneumatic pressure is used as an actuator of the driving device. The employment of such a structure allows the actuation of the driving device to be controlled with a supply-discharge device shared by a first airbag and a second airbag. This simplifies the structure.

(B) A seat device characterized in that the holding member includes a hole in which the second airbag is arranged. The employment of such a structure allows the second airbag to be arranged between a plurality of first airbags. This allows the inflation (deployment) of the second airbag to stably separate a seat cover from the first airbags.

(C) A seat device characterized in that the holding member is one of a plurality of holding members connected by the elastic member. The employment of such a structure allows each of the holding members to be moved by elastic force of the elastic member located between the holding members. This simplifies the driving structure.

The invention claimed is:
1. A seat device comprising:
 a plurality of first airbags inflated and deflated at an inner side of a seat cover;

a holding member that holds the first airbags and is movable along an inner surface of the seat cover;

a driving device that moves the holding member to change positions of the first airbags; and a second airbag that is independent from the first airbags and inflated at the inner side of the seat cover to press the seat cover and separate the seat cover from the first airbags, wherein the first airbags are arranged along the inner surface of the seat cover, the second airbag is arranged between the first airbags,.

the seat device is configured such that the driving device moves the holding member to change positions of the first airbags while the second airbag is inflated at the inner side of the seat cover to press the seat cover and separate the seat cover from the first airbags.

2. The seat device according to claim 1, wherein the holding member is sheet-like and extends along the inner surface of the seat cover.

3. The seat device according to claim 1, wherein the driving device includes an actuator that pulls an end of the holding member.

4. The seat device according to claim 3, wherein the actuator is an air actuator actuated by pneumatic pressure.

5. The seat device according to claim 1, comprising an urging member that urges the holding member in a direction opposite to a direction in which the driving device moves the holding member.

6. The seat device according to claim 1, wherein the holding member includes a first holding element and a second holding element that are connected to each other by an elastic member.

7. The seat device according to claim 1, wherein the driving device is configured to move the holding member in a state in which the first airbags are deflated.

8. A seat device comprising:
a first airbag inflated and deflated at an inner side of a seat cover;
a holding member that holds the first airbag and is movable along an inner surface of the seat cover;
a driving device that moves the holding member to change a position of the first airbag, the driving device including an actuator that pulls an end of the holding member;
a second airbag that is independent from the first airbag and inflated at the inner side of the seat cover to press the seat cover and separate the seat cover from the first airbag; and
a controller configured to:
receive an operation input signal that requests for position adjustment of the first airbag,
in response to receiving the operation input signal, execute an air supply control on the second airbag that separates the seat cover from the first airbag, and
after the seat cover gets separated from the first airbag, execute a drive control on the holding member so that the position of the first airbag changes in accordance with the operation input signal.

9. A seat device comprising:
a first airbag inflated and deflated at an inner side of a seat cover;
a holding member that holds the first airbag and is movable along an inner surface of the seat cover;
a driving device that moves the holding member to change a position of the first airbag; and
a second airbag that is independent from the first airbag and inflated at the inner side of the seat cover to press the seat cover and separate the seat cover from the first airbag,
wherein the driving device is configured to move the holding member in response to the first airbag being deflated and the second airbag being inflated so as to separate the seat cover from the first airbag..

10. The seat device according to claim 1, wherein the second airbag is arranged in a hole of the holding member.

* * * * *